Patented Mar. 3, 1936

2,032,431

UNITED STATES PATENT OFFICE 2,032,431

PROCESS OF TREATING AND ODORIZING GAS

William W. Odell, New York, N. Y.

No Drawing. Application August 1, 1931, Serial No. 554,596

16 Claims. (Cl. 48—195)

My process relates to the introduction of an odoriferous material to gas, or to liquefied gas, for the purpose of giving it sufficient odor to function as a warning agent in case of leakage from confinement. The process also relates to the selection of a preferred odorant or warning agent which, when used in preferred amounts in a gas, give it an odor that is not repulsively unpleasant; it further relates to the simultaneous introduction into the gas of a medium adapted to make the gas humid with respect to the vapor of a liquid boiling at elevated temperature, namely above about 36° C. but preferably above about 79° C.

One of the objects of my invention is to give gas such as water gas, producer gas, natural gas, manufactured gas in general that has an odor of low intensity, or other substantially odorless gas, an odor sufficiently strong that its presence can be detected when it is mixed with air in amounts that are dangerous as regards explosibility or dangerous to breathe. Another object is to prevent the drying of leather diaphragms in the meters and regulators commonly used in gas-distributing systems by introducing into the gas prior to its distribution a relatively small percentage of a selected oil-like material having a boiling point above 30° C.; the amount thus introduced being sufficient to give the gas appreciable humidity with reference to oil vapor. The oil like material used should be entirely volatile at a temperature below its cracking-temperature. I find that a particular advantage is derived from the introduction of said oil or oil-like material into the gas when the odorant is dissolved therein. The odorant, which is usually concentrated must be introduced into the gas stream at a rate varying with changes in stream velocity of the gas in order to obtain uniform concentration of odorant; this is more readily and more accurately controlled when the odorant is dissolved in a fluid solvent—commonly a liquid solvent. Thus in accomplishing the double purpose of adding oil vapors and an odorant gas, the accuracy of odorizing the gas is increased by the simultaneous introduction of the diluent, volatile oil-like material.

There are a limited number of compounds that are suitable for use as odorants for gas intended to be dispensed through systems such as "city-gas" distributing systems. The reason for this is that most of the volatile odoriferous materials commonly available are not stable under the conditions that obtain in gas-distributing systems; they either polymerize, oxidize, reduce, attack the metal pipes, or react forming gummy matter in the system. Some of the materials that are satisfactory for some conditions are, methyl mercaptan, ethyl mercaptan, propyl mercaptan, butyl mercaptan, amyl mercaptan, ethyl sulphide, propyl sulphide, butyl sulphide, mixtures of these and similar materials, pyridine and certain other bases.

In my research with these materials I find that the organic sulphides and mercaptans produce, even in dilution, a skunk like odor that is so repulsive that serious complaint has been made by consumers objecting to the use of the vile-smelling materials. Furthermore, their presence in city gas focuses attention to the small leaks of little importance that can not be readily eliminated. I find that a blend can be made in which the organic sulphur compounds can be used without causing serious objection on the part of the gas consumers.

The proportions of the various components of said blend are preferably varied somewhat according to the temperature and pressure of the gas in which it is to be used as well as according to the composition of said gas. For example, I commonly prefer to use naphthalene as one ingredient of the blend, but this is done chiefly when the gas initially is substantially free from naphthalene. Because of the low partial pressure of naphthalene in a gas at high pressure and low temperature it is necessary to consider such relations in preparing a blend. Thus with gas at 30 pounds gage pressure the maximum amount of naphthalene that can remain in the vapor phase in a gas is approximately 22 grains per 1000 cubic feet of said gas at 50° F. and only 7 grains at 32° F. However, at one atmosphere absolute pressure the amounts of naphtalene that can be present in the gas as a vapor at 32°, 50° and 60° F. are respectively 20, 67 and 110 grains per 1000 cubic feet. The amount of naphthalene I employ in my blend is such that when the blend is introduced into a stream of said gas in the required amounts it will not yield to said gas stream a greater amount of naphthalene than can be retained in the vapor phase under the pressure and temperature conditions prevailing in the gas system into which it is introduced.

Using ethyl mercaptan, whose volatility (vapor pressure) is so much greater than that of naphthalene, I am chiefly concerned with the concentration desired. I find that using ethyl mercaptan alone in a substantially odorless gas the required amounts are within the approximate limits of 3 to 8 grains per 1000 cubic feet of gas. Using pyridine alone about 30 to 80 grains are required per 1000 cubic feet of gas. Pyridine boils at 115° C. and has a vapor pressure great enough to maintain it in the vapor phase in these dilutions except at high pressure and low temperature.

When a gas is transmitted at high pressure in the winter months, subsequently distributed at lower pressure and it is not feasible to introduce the odorants in the low pressure system it is frequently necessary to employ certain desirable odorants in lesser amounts than the preferred or required amounts if used alone. Thus in my blend I am not only able to produce a smoother mixture, one with a less disagreeable odor, but able to produce a warning agent using desired odorants which used alone would not be satisfactory. Naphthalene and pyridine give a "gassy" odor to the gas, that is, they contribute an odor that brings to mind manufactured combustible gas. Pyridine is soluble in water and this property is desirable of at least one of the components of a blend. My preferred blend comprises:

An organic sulfur compound, and

An organic nitrogen base.

More specifically it usually includes a mercaptan with or without naphthalene in solution in a gasoline or gasoline-product containing constituents boiling above 30° C. and preferably above 79° C. An example of a satisfactory blend is:

Blend 1

| | Parts by weight |
|---|---|
| Ethyl mercaptan | 1 |
| Pyridine | 5.0 to 10.0 |
| Naphthalene | 0 to 5 | dissolved in a common solvent such as natural gasoline containing appreciable amounts of pentane or components boiling at a higher temperature.

Another formula comprises:

Blend 2

| | Parts by weight |
|---|---|
| Ethyl mercaptan | 1 |
| Pyridine | 5.0 to 10.0 |
| Naphthalene | 0.5 to 5.0 |
| Liquid solvent | 10 to 250 |

The liquid solvent is preferably a natural gasoline or a product therefrom having components boiling above 30° to 36° C. and substantially free from gum-forming compounds such as diolefins, and preferably free from unsaturated hydrocarbons; in other words, the solvent preferably should be one or more paraffin hydrocarbons.

Another blend coming within the confines of my invention is:

Blend 3

| | Parts by weight |
|---|---|
| An amyl mercaptan | 1 |
| Ethyl mercaptan | 1 to 5 |
| Nitrogen base (preferably pyridine) | 1 to 10 |
| Solvent—amount desired, preferably 10 to 50 parts | |

Naphthalene usually should be incorporated in the above when pressure and temperature conditions permit, in amounts only that will remain in the vapor phase.

It is recognized that naphthalene does not have as intense an ordor in dilution as the mercaptans or certain organic sulphides, however its presence in the gas not only tends to ameliorate the nauseating effect of which characterizes the odor of said mercaptans, but it makes possible the use of less of the mercaptans. Amyl sulphide may be substituted for the amyl mercaptan or a part of it in Blend 3 above.

A benefit I derive from the use of a nitrogen base in conjunction with an organic sulphide or mercaptan is that the former counteracts the acidic effect of the latter; the former is basic in reaction whereas the latter are acidic in their properties. I prefer to have the basic reacting material present in slightly greater molecular amounts than the acid reacting materials; the corrosive action of the organic sulphur compounds on the pipe lines is decreased when the bases or a base such as pyridine is present in molecular excess of the acidic materials.

Although any amount of solvent may be used, I commonly prefer to use a blend comprising 5 to 20 per cent of odorants and 95 to 80 per cent solvent. With such dilution the accuracy of control of the amount supplied to the gas is increased from 20 to 5 fold respectively. There is another factor governing the amount of solvent used and that is the amount of high-boiling oil desired in the gas. When the amount of oily matter desired in the gas is greater than would be supplied by the blend having 80 to 95 per cent solvent the amount of said solvent in said blend may be increased.

The solvent should comprise pentane or mixtures containing pentane and higher-boiling hydrocarbons; some butane is commonly present in the commercial grades of solvent supposed to comprise natural gasoline components boiling above 86° F. For high pressure transmission commercial pentane is a highly satisfactory solvent; pentane mixed with the paraffins having higher boiling points is satisfactory at moderate to atmospheric pressure. Accordingly I do not limit myself to fractions free from butane; rather I prefer components boiling above 86° F.

The amount of odorant required for a particular purpose depends upon the effect desired. For example, when a gas containing carbon monoxide is odorized it is desirable to give it an odor strong enough to make its presence detectable, when diluted in air in such proportions that the gas-air mixture contains less than 0.1 per cent of carbon monoxide. Similarly, when the object is to detect leaks and prevent explosions when combustible gas containing little or zero amount of carbon monoxide is used; in this gas the leaking gas must be detectable in mixtures with air when the air-gas mixture is considerably leaner than that mixture representing the low limit of inflammability. Normally the odor should be strong enough to be detectable when the gas is diluted with air from 1 to 100 to 1 to 500 parts by gas volume.

Pentane and other paraffins have boiling points and vapor pressures substantially the same as some of the alkyl sulphur compounds and nitrogen bases, as shown in the following table:

| | Boiling points centigrade |
|---|---|
| Ethyl mercaptan | 34.7 |
| Propyl mercaptan | 67.0 |
| Butyl mercaptan | 97.0 |
| Iso butyl mercaptan | 88.0 |
| Ter-butyl mercaptan | 66.0 |
| Ethyl sulphide | 91.6 |
| Propyl sulphide | 142.0 |
| Iso propyl sulphide | 120.4 |
| Amyl mercaptan | 126.0 |
| Pyridine | 115.3 |
| Propyl pyridine | 165.0 |
| Pentane | 36.2 |
| Hexane | 69.0 |
| Heptane | 98.4 |

Other odorants such as methyl anthranilate, diphenyloxide may be used in conjunction with the above named materials, but are not essential nor particularly desirable components of the blend.

It appears that the use of paraffins having high boiling points (higher than 30° C.) is beneficial other than for the purpose of adding oiliness to the gas; it retards the rate of decomposition of the sulphur compounds in the gas, that is, it retards the corrosion of the metal pipes by the corrosive action of said compounds. This effect is also promoted by the use of organic bases with the sulphur compounds.

It is obvious that the beneficial effects of, and the advantages in the use of the paraffinic hydrocarbon or a plurality of such hydrocarbons substantially free from gum-forming unsaturated hydrocarbons as a solvent for the odorant, are obtainable regardless of the specific kind of odorant employed.

So far as I am aware it has not been recognized heretofore that an inhibitor is required in the use of mercaptans and similar odoriferous, volatile sulphur compounds; I have shown that it is necessary and claim it as my own invention. Similarly the use of an odorant and an inhibitor of corrosion in solution in a paraffinic hydrocarbon oil which is substantially free from gum-forming unsaturated hydrocarbons and which boils above 30° C. is shown to be new so far as I am aware and is claimed as my own.

Having described my invention so that one skilled in the art can practice it, I claim:

1. The process of treating and odorizing combustible gas, comprising, introducing into said gas an odorant blend comprising essentially a volatilizable odoriferous organic sulphur compound of the class mercaptans and sulphides having a higher boiling point than ethyl mercaptan and a volatilizable organic tertiary amino compound having the property of neutralizing the acidic properties of said sulphur compound.

2. The process of treating and odorizing combustible gas, comprising, introducing into said gas an odorant blend comprising essentially a readily volatilizable organic nitrogen base being an amino compound, and a readily volatilizable alkyl, odoriferous sulphur compound of the class mercaptans and sulphides having a boiling point higher than that of ethyl mercaptan, said amino compound having the property of inhibiting the corrosive action of said sulphur compound on metal.

3. The process of treating and odorizing combustible gas, comprising, introducing into said gas an odorant blend comprising pyridine and an alkyl mercaptan dissolved in a volatilizable liquid solvent comprising a hydrocarbon of the paraffin series boiling above 86° F.

4. The process of treating and odorizing combustible gas, comprising, introducing into a stream of said gas a liquid comprising a mixture of odorants including pyridine and a volatile alkyl sulphur compound having a higher boiling point than ethyl mercaptan, dissolved in a natural gasoline containing a large percentage of pentane.

5. The method of introducing an odorizing material into a gas for the purpose of odorizing the same which includes the steps of diluting said material in a liquid hydrocarbon obtained from natural gasoline which is substantially free from gum-forming unsaturated hydrocarbons and which has a boiling point above 86° F. and incorporating the compound so formed in said gas in the vapor phase.

6. The method of odorizing gas which includes the steps of dissolving in a common solvent an odorizing material comprising a volatilizable organic sulphur compound having a normally corrosive effect on the gas distribution equipment and a volatile organic tertiary amine adapted to inhibit the corrosive effect of said odorizing compound and incorporating the solution so formed in the gas in the vapor phase.

7. In the process of odorizing combustible gas, which comprises introducing into said gas an odorant blend comprising an organic, odoriferous, volatilizable sulphur compound and a corrosion inhibiting agent in the odorization of combustible gas, the step of introducing said blend into the gas in solution in a readily volatilizable paraffin hydrocarbon which is substantially free from gum-forming unsaturated hydrocarbons and which boils at a temperature higher than 86° F.

8. In the process of odorizing combustible gas, which comprises introducing into said gas an odorant blend comprising a volatilizable organic odoriferous sulphur compound and an inhibitor to inhibit the corrosive action of said sulphur compound on metal, the steps dissolving said blend in a volatilizable liquid paraffinic hydrocarbon boiling above 30° centigrade and being substantially free from gum-forming unsaturated hydrocarbons, and introducing the blend solution into a stream of gas to be odorized.

9. The process of odorizing combustible gas, comprising, introducing into said gas an odorant blend comprising a volatilizable odoriferous organic sulphur compound of the class mercaptans and sulphides having a higher boiling point than ethyl mercaptan, naphthalene and a readily volatilizable inhibitor adapted to inhibit the corrosive action of said sulphur compound on metal, said blend being in solution in a volatile paraffinic hydrocarbon which boils above 30° C. and which is substantially free from gum-forming unsaturated hydrocarbons.

10. The process of treating and odorizing combustible gas, comprising, introducing into said gas an odorant blend comprising essentially an odoriferous organic volatilizable sulphur compound having a higher boiling point than ethyl mercaptan and a volatilizable organic nitrogen base having the property of inhibiting the corrosive action of said sulphur compound on metal, said blend being initially dissolved in a paraffinic solvent which is readily volatilizable, boils above 79° C. and which is substantially free from gum-forming unsaturated hydrocarbons.

11. In the process of odorizing combustible gas employing as an odorant an odoriferous volatilizable organic sulphur compound, the step, introducing said odorant into a stream of said gas simultaneously with the introduction into said gas of a readily volatilizable corrosion inhibitor and a readily volatilizable paraffinic hydrocarbon oil which oil boils at a higher temperature than 30° C. and which is substantially free from gum-forming unsaturated hydrocarbons, said odorant and inhibitor being initially in solution in said paraffinic hydrocarbon, said inhibitor having the property of inhibiting the corrosive action of said sulphur compound on metal.

12. The process of treating and odorizing combustible gas, comprising, introducing into said gas a predetermined amount of a readily volatilizable liquid comprising a blend of a volatile, odoriferous, alkyl sulphur compound of the class mercaptans and sulphides but having a higher boiling point than ethyl mercaptan, and a volatile amino compound having the property of inhibiting the corrosive action of said sulphur compound on metal, which blend is dissolved in a volatile paraffin hydrocarbon which boils above 86° F. and which is substantially free from gum-forming unsaturated hydrocarbons, said predetermined amount being that required to yield to said gas approximately 1 to 6 grains of said sulphur compound and 1 to 40 grains of said amino compound per 1000 cubic feet of said gas.

13. The method of introducing an odorizing material comprising essentially a blend of a volatile, odoriferous mercaptan and a readily volatilizable amino compound into a gas for the purpose of odorizing the same, which includes the steps of diluting said blend in a volatile paraffin hydrocarbon having a boiling point above 86° F., and incorporating the solution so formed in said gas in the vapor phase, said paraffin hydrocarbon being substantially free from gum-forming unsaturated hydrocarbons.

14. The method of introducing into a combustible gas for the purpose of odorizing said gas an odorizing material comprising essentially a blend of an odoriferous alkyl sulphur compound of the class mercaptans and sulphides boiling above the boiling point of ethyl mercaptan and a volatile amino compound, which includes the steps of diluting sa'd material in a natural gasoline which is substantially free from gum-forming unsaturated hydrocarbons and which has a boiling point above 86° F. and incorporating the solution so formed in said gas in the vapor phase.

15. The method of odorizing gas which includes the steps of dissolving in a common solvent an odoriferous, volatile, organic odorant of the class mercaptans and sulphides having a normally corrosive effect on gas mains, and an organic volatile amino compound adapted to inhibit the corrosive effect of said odorant, and incorporating the solution so formed in the gas in the vapor phase, said solvent being a volatile liquid paraffinic hydrocarbon substantially free from gum-forming unsaturated hydrocarbons but boiling at a higher temperature than 86° F.

16. The process of treating and odorizing combustible gas, comprising, incorporating in said gas in the vapor phase, an odorant comprising a blend of a volatile odoriferous, organic sulphur compound of the group mercaptans and sulphides, and a volatile organic amino compound adapted to inhibit the corrosive effect of said sulphur compound on metal, said blend being initially in solution in a readily volatilizable paraffinic hydrocarbon liquid which is substantially free from gum-forming unsaturated hydrocarbons and which boils at a higher temperature than 79° C.

WILLIAM W. ODELL.